April 22, 1930.                A. I. LINDEN                1,755,299
                              STEERING DEVICE
                     Filed Dec. 4, 1926          4 Sheets-Sheet 1

Inventor
Arvid I. Linden
By his Attorney

April 22, 1930.   A. I. LINDEN   1,755,299
STEERING DEVICE
Filed Dec. 4, 1926    4 Sheets-Sheet 2

Inventor
Arvid I. Linden
By his Attorney

April 22, 1930.  A. I. LINDEN  1,755,299
STEERING DEVICE
Filed Dec. 4, 1926   4 Sheets-Sheet 3

Inventor
Arvid I. Linden
By his Attorney

April 22, 1930.   A. I. LINDEN   1,755,299
STEERING DEVICE
Filed Dec. 4, 1926   4 Sheets-Sheet 4
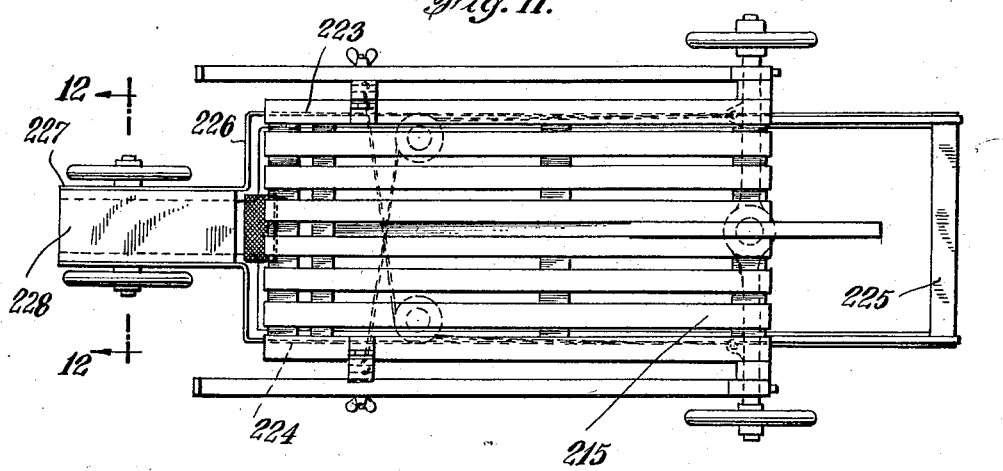
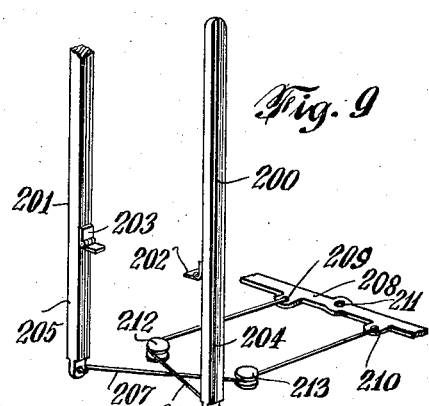
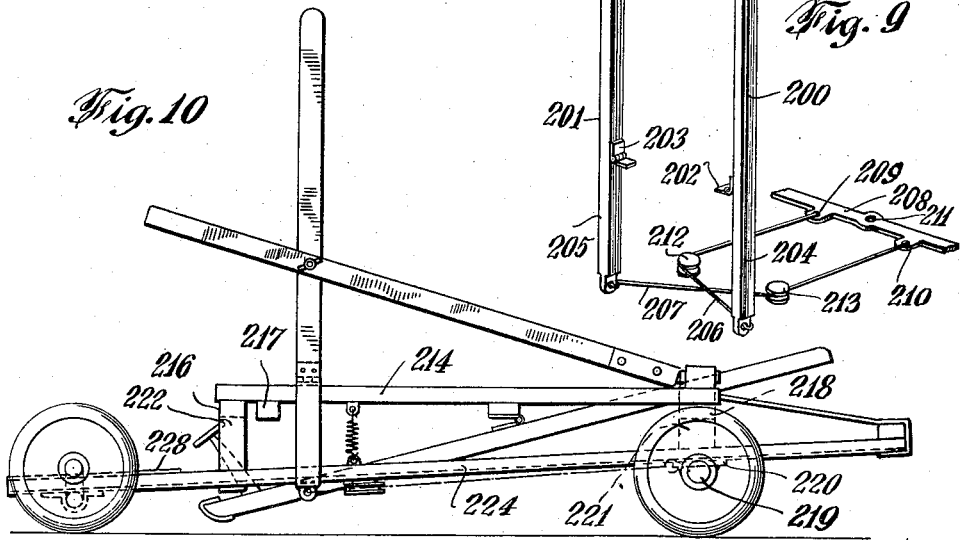
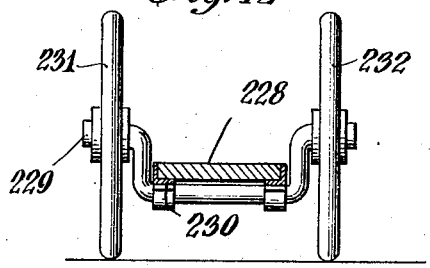
Inventor
Arvid I. Linden
By his Attorney Patented Apr. 22, 1930

1,755,299

UNITED STATES PATENT OFFICE

ARVID I. LINDEN, OF BROOKLYN, NEW YORK

STEERING DEVICE

Application filed December 4, 1926. Serial No. 152,616.

This invention relates to improvements in steering devices and more particularly refers to a novel and improved arrangement of steering means adapted for use in connection with toy vehicles, coaster wagons, and children's vehicles generally.

The main object of the present invention is to provide a novel and improved arrangement of means for controlling the steering mechanism in children's vehicles of the character mentioned, with a view to obtaining a sensitive and effective control in a manner permitting full freedom and ease of movement of the child's body.

Another object of this invention is to provide a novel and improved type of steering control mechanism adapted for use in connection with children's vehicles, which owing to the simplicity of its design can be produced at relatively low cost, yet, insuring full and efficient control of the steering mechanism.

A further object is to provide a steering control arrangement which is particularly adapted for use in connection with children's vehicles of the type where a child standing at the rear of the vehicle may propel the same by pressing one foot against the ground, the arrangement being such as to permit full freedom of movement of the child's body while affording a very sensitive and efficient system of control.

As a further feature, I provide means whereby the steering control mechanism may be operated either by a child standing at the rear of the vehicle or by a child seated in front, riding as a passenger.

With these and other objects in view, as will more fully appear as the description proceeds, this invention furthermore comprises certain novel arrangements and constructions of parts as will be hereinafter fully described and claimed in the appended claims.

My invention may be applied in connection with vehicles of various types and designs, and this possibility is illustrated in the drawings, where:

Fig. 9 is a detail view in perspective of a somewhat simpler design;

Fig. 10 is a side view in elevation of a child's vehicle of a somewhat different construction, provided with a steering arrangement shown in Fig. 9;

Fig. 11 is a plan view of the same; and

Fig. 12 is a rear view in elevation of the same.

In another patent application for child's vehicle, filed by me May 20th, 1925, Serial No. 31,477, I have described and claimed a type of vehicle provided with a platform at the front and a foot support at the rear, and furthermore provided with a steering and braking means adapted to be independently operated either by a child seated on the platform, or by a child standing on the foot support.

One of the main features of the vehicle described in the said application, is the use of a particularly efficient and sensitive method of steering, including the use of relatively long steering control levers, extending within convenient reach of the child at the rear and permitting a free and easy swing of the body of said child when steering the vehicle to one side or the other.

In connection with said steering control levers, I have described a system of steering connections between said levers and the front axle, including the use of a rock shaft longitudinally mounted underneath the platform, and means for connecting said rock shaft to the steering knuckles.

One of the objects of the present invention is to simplify this part of the vehicle's construction, without sacrificing any of its advantages, the immediate results being a lightening of the entire structure, a material reduction in the cost of manufacture and a mechanically preferable system of transmission of movement from the controlling to the operating end of the steering mechanism.

Another object is to provide a different arrangement of steering control levers whereby the advantages of sensitive control and convenience of operation due to the use of control levers such as described in my previous application are retained, but the levers themselves are mounted to swing in a front to rear direction instead of transversely of the axis of the vehicle.

The simplicity of design and construction of the steering mechanism as a whole has been obtained by combining the use of swinging control levers with that of flexible connections associated therewith, transmitting the movement of said levers to the front wheels or to the front axle. The use of flexible connections between the steering control member and the operating member is not in a broad sense new, per se; but the combination of flexible connecting means and swinging control levers of the character described in my previous and in the present application, is, I believe new, and constitutes an improvement over the previous art both on account of its simplicity and on account of the positive, effective and sensitive control, which is made possible thereby.

Figure 1:
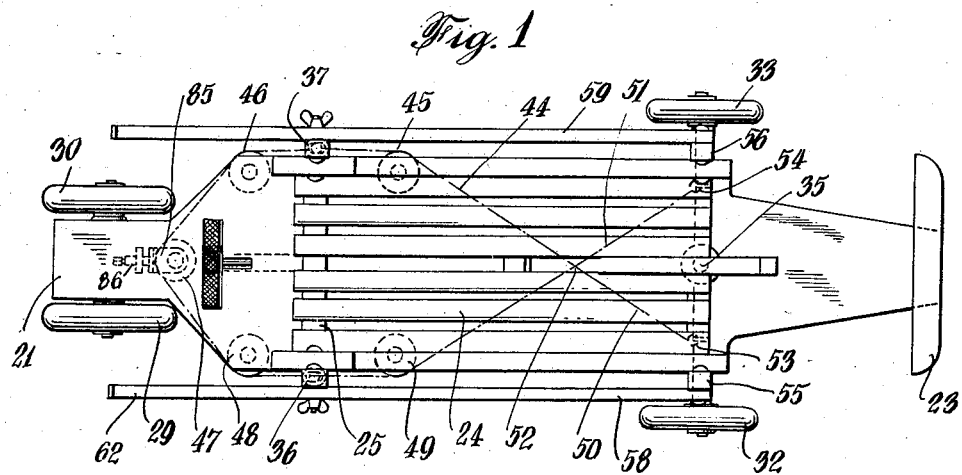
Fig. 1 is a plan view of a child's vehicle embodying the main features of the present invention.
Figures 2, 3:
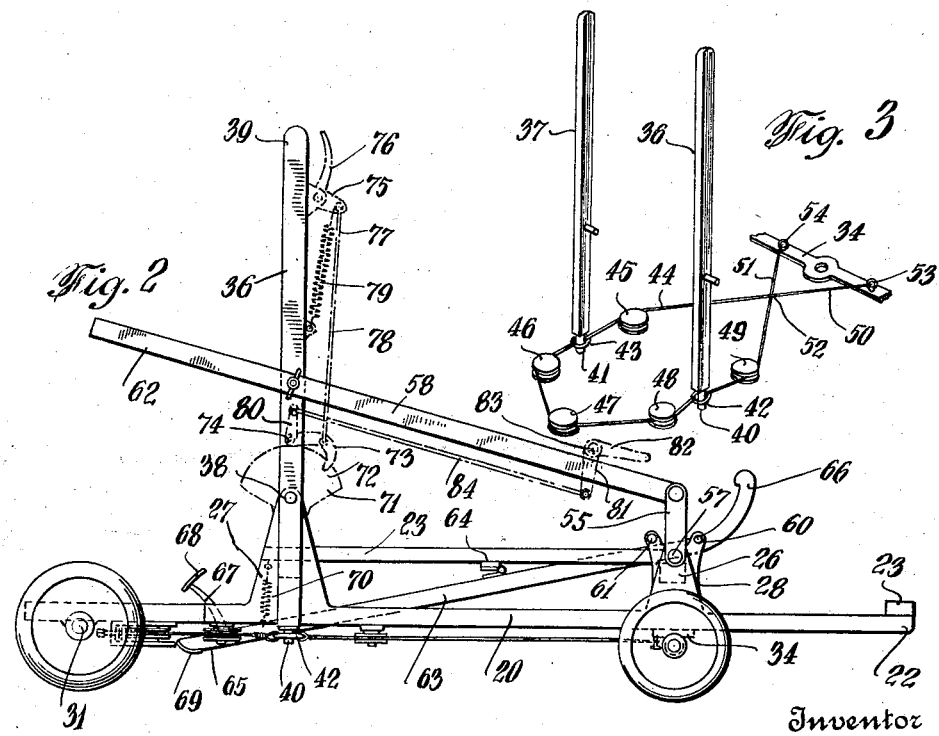
Fig. 2 is a side view in elevation of the same.
Fig. 3 is a detail view in perspective of the steering arrangement used in the vehicle of Figs. 1 and 2.

The combination of the two main features mentioned, is illustrated in Figs. 1, 2 and 3, where 20 designates the main vehicle platform, terminating at the rear in a relatively narrow section constituting a foot support 21. The front end of said platform, also preferably narrows down from the central portion thereof to its extreme end 22, which is preferably provided with a transverse member of bar 23, extending laterally thereof and providing a convenient foot rest for the child riding on the front part of the vehicle.

In order to provide better accomodation for the occupant of the front part of the platform, the main platform is preferably provided at its intermediate portion with an additional seating platform 23, spaced therefrom a sufficient distance to provide a convenient seat for the child riding on the vehicle. Said seating platform is preferably made up of a series of longitudinally extending slats or strips 24, supported by two cross members 25, 26, mounted on uprights 27, 28, integral with or attached to platform 20, and projecting upwardly therefrom.

Platform 20 is supported on a pair of rear wheels 29, 30, mounted on a rear axle 31, attached to the rear end of the platform 21, and projecting laterally therefrom, and a pair of front wheels 32, 33, mounted on an axle 34, which is attached to swing about a vertical pivot 35, depending from platform 20. These wheels may be of any desired character and may be provided with ball bearings, tires and other features tending to improve the riding qualities of the car.

The main frame of the vehicle thus described, may therefore conveniently accomodate two children, one seated on platform 23 and the other one standing on foot support 21 at the rear, the propelling being done by the child at the rear by pushing with one or the other foot against the ground. Since it is also possible for one child alone seated on the platform to ride the vehicle especially when coasting downhill where no propulsion is needed, it is desirable to provide steering and braking means adapted to be operated independently by either child.

As stated in my previous application, I prefer to provide means for controlling the steering mechanism in the form of levers having relatively long leverage, extending to a considerable distance above the platform at the rear within convenient reach of the child standing on the foot support.

In the arrangement described in my previous application, the steering control levers are pivotally mounted on longitudinally extending pivots so that they are movable transversely of the axis of the vehicle; and by means of suitably arranged connections the arrangement may be made to steer the vehicle in the same direction as that in which the upper ends of the steering control levers are moved. Thus, the child propelling the vehicle may steer to the left or to the right by swinging his body in the direction in which he desires to turn, thereby moving the steering control levers in the direction in which he sways his body. I have found that a very efficient control may also be obtained by causing the steering levers to swing in a longitudinal direction, the lever at one side moving in a direction opposite to that of the lever at the other side.

This type of control does not depend on the swaying of the child's body for its action, and therefore it is not quite as easy and sensitive as the type of control described in my other application; but on the other hand, the child at the rear has a firmer hold on the steering levers which insures a safer riding on rough ground, and furthermore the exercise provided by the exertion of the force necessary to move the levers one way or the other is extremely beneficial to the muscles of the arms and induces regular and deep breathing.

I accordingly provide two side substantially vertical steering levers 36, 37, pivotally mounted at 38, onto the rear uprights 27, so as to be movable in a front to rear direction. The upper ends of said levers extend for a considerable length above the platform to a point 39 within convenient reach of the child standing on the foot support at the rear; and the lower ends extend to a point slightly below platform 20 and are provided with a pin or stud such as 40, 41, projecting downwardly therefrom. Said pins or studs 40, 41, are each inserted through a ring or eye 42, 43, which is inserted in a flexible connection attached to the front axle so that by moving one of the spring levers in one direction, and the other one in the opposite direction, the flexible connection will cause angular movement of the front axle in the steering direction desired.

In the arrangement shown, the flexible connection consists of a continuous cable or chain 44, running over two guide pulleys 45, 46, at one side, then running over a central pulley 47 at the rear, then over two other guide pulleys 48, 49, at the other side, the two front ends of said cable 50, 51, crossing one another at an intermediate point 52, and being connected to the front axle 34 at points 53, 54, respectively, on opposite sides of and at an equal distance from pivot 35.

The result of this arrangement is that if the upper end of control lever 36 is moved towards the front while the upper end of lever 37 is moved towards the rear, the lower end of lever 36 forces to the rear, ring or eye 42, while the lower end of lever 37 forces to the front, ring or eye 43. Ring 42 will therefore set under tension and pull towards the rear the section of cable 51 attached thereto, causing the front axle to swing in a counterclockwise direction, steering the vehicle to the left; at the same time the ring or eye pays the cable section 50 attached thereto at the other side, permitting the angular displacement of point 53 about pivot 35 caused by the angular movement of the axle. The vehicle will be steered in the opposite direction if the upper end of lever 36 is moved towards the rear and the upper end of lever 37 is forced towards the front, the total length of the cable remaining always the same.

Besides being recommended by its obvious simplicity, the described arrangement has the further advantage of taking up very little room in a vertical sense, so that platform 20 may be as close to the ground as may be desirable; this is particularly important when the vehicle instead of being of the wheel type is of the sleigh type, where it is important to have a rigid construction and a low center of gravity.

It is desirable as stated, that the steering mechanism be also operable by the child sitting on the platform; therefore, I provide two substantially vertical arms 55, 56, pivotally mounted at 57 on uprights 58, one at each side of platform 23 at the front thereof. By providing an articulated connection between control levers 36, 37, and arms 55, 56, by means of side bars 58, 59, I produce a structure permitting levers 36, 37 to be either operated direct or by means of bars 58, 59. These bars constitute in effect, side braces which the child on the platform may grasp and which also prevent any load which may be carried on the vehicle from slipping laterally off the platform.

The child riding on the platform may grasp these braces and move them from front to rear in opposite directions so as to operate levers 36, 37 in the manner described, effecting the steering of the vehicle in the desired direction. Uprights 28 are preferably provided with two stops 60, 61, one at the front and one at the rear of each arm 55, 56, limiting the angular motion thereof. The bars or braces 58, 59 are preferably extended rearwardly beyond the steering levers 36, 37, so that the rear ends 62 of these braces constitute handle bars which the child may grasp in order to tilt the vehicle so as to lift the front wheels off an obstruction or onto a curb, or to raise the rear end of the vehicle if desired.

The brake means illustrated are of the type described in my other patent application above referred to and also described and claimed in a divisional application thereof, filed simultaneously herewith, entitled "Vehicle brake," and the same includes a lever 63 which is hinged or pivoted intermediate of its ends to the transverse slat 64.

Said lever runs from front to rear, centrally of the structure and its rear end 65 is inserted through and beyond platform 20, while its front end 66 extends between two of the slats 24 above cross member 26, and projects above and beyond the front end of platform 23. The rear end is provided with a stem 67 projecting upwardly through and beyond platform 20, said stem carrying a pedal 68, within convenient reach of the foot of the child standing on the foot support. Said child may easily place one foot against pedal 68 and press it down forcing end 65 of the brake lever down onto the ground, said end 65 being provided with a shoe 69 which will act as a brake when pressed against the ground; or else the child sitting on the platform with his foot on the foot rest 23 will have the front end 66 of the brake lever approximately between his knees, so that he may grasp it and pull upwardly so as to force the brake shoe 69 against the ground. He may bring his full strength to bear on the brake lever as he may brace himself against the front foot rest while pulling upwardly and rearwardly on the brake lever. The brake lever is normally held with the brake out of contact with the ground, and any suitable means may be employed for this purpose, such as for instance, a spring 70.

If desired, the front wheels may normally be held in alignment with the rear wheels so that the vehicle will travel in a straight line unless the steering levers are voluntarily actuated. Any suitable means for locking the steering mechanism may be employed, for instance, one or both uprights 27 may be provided with a segmental extension such as 71 having a notch 72, normally engaged by the tip of lever 73 pivotally mounted onto one or both steering levers 36, 37, at 74. Said lever 73 is connected to an arm 75 of a crank lever 76 pivotally mounted at 77 at the upper part of one or both steering levers, by means of a connection 78.

Arm 75 is normally held down by a spring 79, causing lever 73 to interlock with segmental extension 71 as shown. In order to operate the steering levers, lever 76 must be pressed against the steering levers, by the hand grasping the same, against the action of spring 79, and in this manner lever 73 will be released from engagement with segmental extension 71 and will permit angular movement of the steering levers about pivots 38.

The locking mechanism described may also be controlled by the child sitting on the platform by providing lever 73 with a crank arm 80, and connecting it to arm 81 of a crank lever 82 pivoted at 83 on brace or braces 58, 59, by means of a connection 84. By forcing lever 82 against the brace, arm 81 will be displaced angularly to the left and lever 73 will also in this case become disengaged from segmental extension 71.

The locking mechanism described, is only shown in dotted lines in Fig. 2 and is not shown in Fig. 1 because its use is optional and is not strictly necessary.

It is possible that after some use, the cable used to transmit motion from the steering levers to the front axle may become slack due to elongation unless the flexible element used is of a non-extensible nature; and therefore if desired, means for adjusting the tension of the cable may be introduced, for instance, by mounting pulley 47 on a support 85, adjustable from front to rear by means of a screw 86, as shown.

Figure 4:
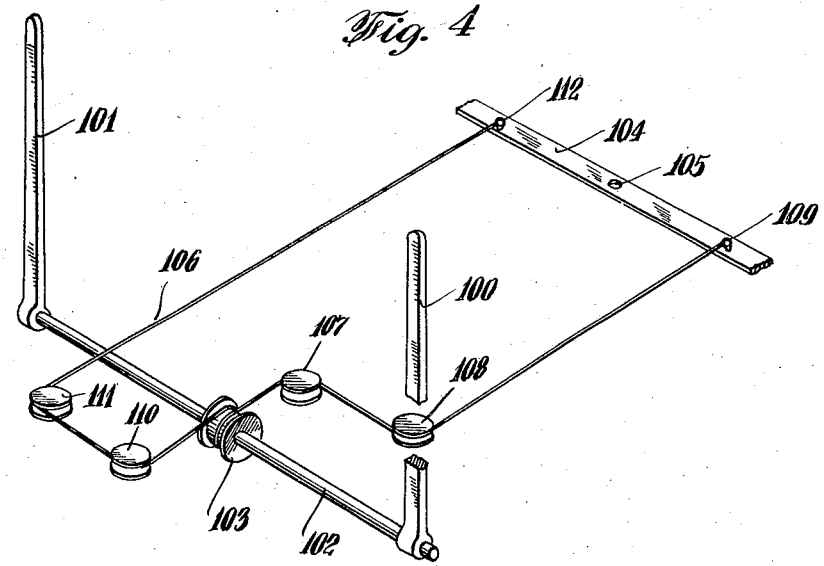
Fig. 4 is a detail view in perspective of a different type of steering arrangement.

In Fig. 4, I illustrate a steering arrangement which may be used with the same type of vehicle, which also includes the combination of steering levers movable from front to rear and a flexible connection between said steering levers and the front axle; but in the present case both steering levers move simultaneously in the same direction, and therefore, the arrangement is preferably provided with some suitable means for locking it in a normal position; such arrangement is not shown but may be of the type previously described with suitable modifications.

The steering mechanism comprises two side levers 100, 101, mounted on a shaft 102, running transversely of the platform and provided with a drum 103. 104 designates a front axle transversely mounted on a central vertical pivot at 105, and 106 designates a continuous cable or chain wound upon drum 103, and having one of its ends running over two idler pulleys 107, 108, and then connected to the front axle at 109, and the other end running over two idle pulleys 110, 111, and then connected to the front axle at point 112, symmetrically arranged on said axle to point 109, with reference to pivotal point 105.

By virtue of an angular displacement of levers 100, 101, to the front or to the rear, drum 103 will be rotated in a clockwise or in a counterclockwise direction, respectively; if the drum is rotated in a clockwise direction it will cause the end of the cable attached to point 112 to wind upon the drum while the other end attached to point 109 unwinds therefrom; therefore, axle 104 will be displaced angularly in a counterclockwise direction. In a similar manner if drum 103 is rotated in a counterclockwise direction, the end of the cable attached to the front axle at 109 will be wound upon the drum while the other end is unwound, and the front axle will be displaced angularly in a clockwise direction, steering the vehicle to the right.

Figure 5:
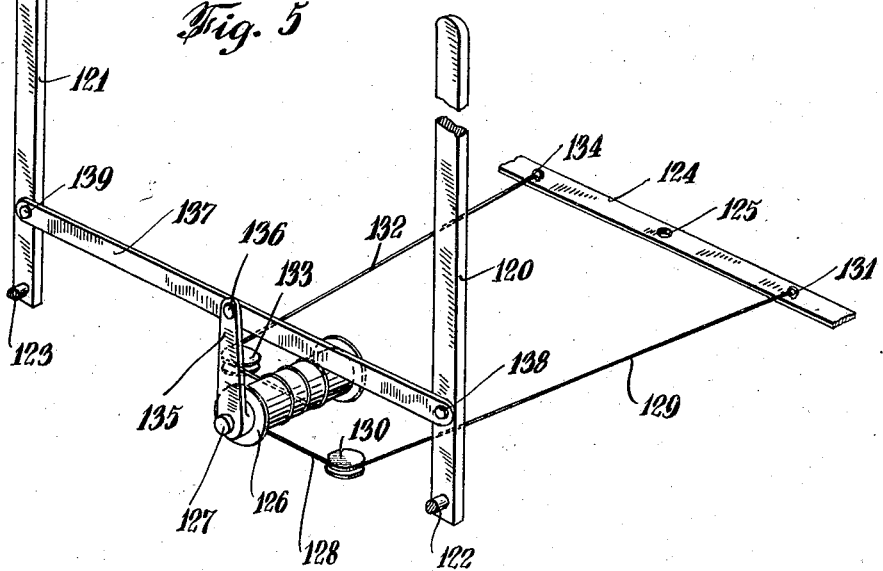
Fig. 5 is a detail view in perspective of a still different type of steering arrangement where the control levers are movable transversely of the longitudinal axis of the vehicle.

The combination of steering levers of the type described and flexible connecting means between said steering levers and the front axle is not limited to steering levers movable from front to rear. For instance, in Fig. 5, I illustrate an arrangement where levers movable transversely of the axis of the vehicle are used.

In the same 120, 121, designate two steering levers upwardly extending one at each side of the vehicle at the rear thereof, pivotally mounted respectively at their lower ends at 122, 123, so as to be angularly movable transversely of the axis of the vehicle. 124 designates the front axle pivotally mounted about a vertical central pivot at 125. A drum 126, is mounted on a longitudinal shaft 127 and around said drum is wound in one or more coils a flexible connecting element 128, having one of its ends 129 passing over an idler pulley 130, and then attached to the front axle at 131, while the other end 132 passes over idler pulley 133 and is attached to the front axle at a point 134 symmetrically arranged to point 131 with reference to pivotal point 125.

Shaft 127 carries an upwardly extending arm 135 which is pivotally connected at 136 to a cross bar 137 extending between steering levers 120, 121, and forming an articulated connection therebetween; being pivotally attached to said steering levers by pins or bolts 138, 139, respectively.

By virtue of the arrangement described, it will be observed that angular displacement of steering levers 120, 121 towards the left will result in a counterclockwise rotation of drum 126, causing winding of cable end 132, and unwinding of cable end 129, so that the steering axle is rotated in a counterclockwise direction about its pivot and the vehicle will turn to the left, that is to the same side towards which the steering levers have been moved. Thus the child propelling the vehicle may steer to the left or to the right by swaying his body in the direction in which he desires to turn and thereby moving the steering levers in the direction in which he sways his body. This renders steering somewhat automatic, as the natural tendency is to turn in the direction towards which the vehicle is to be steered, as has been pointed out by me in my other patent application for child's vehicle, above referred to.

The arrangement described therefore, constitutes a simplification of the steering mechanism described in said application, it being understood that while in the present case, the same is applied in connection with a front axle of the pivoted beam type. With suitable modifications the arrangement may also be applied in connection with front wheels mounted on individual steering knuckles.

Figure 6:
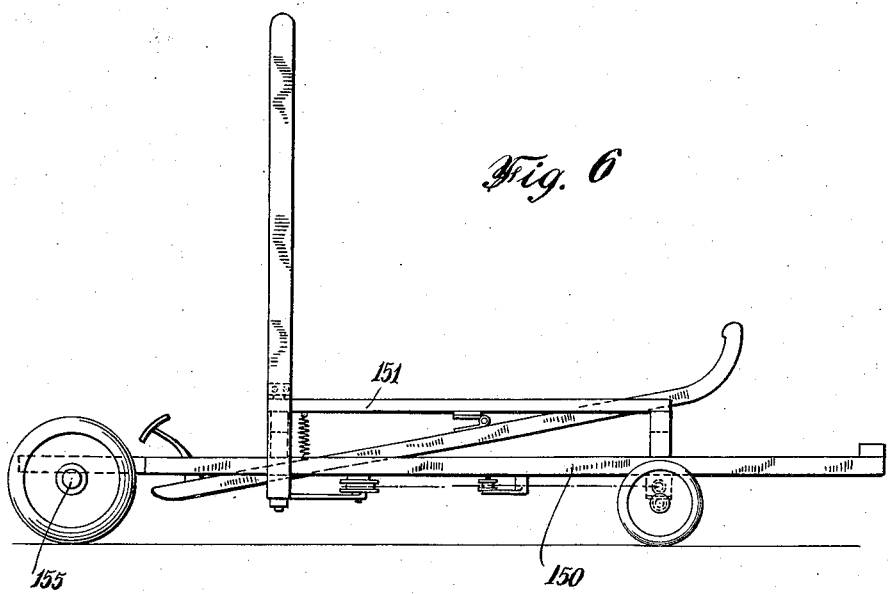
Fig. 6 is a side view in elevation of a child's vehicle showing still another type of steering arrangement.
Figure 7:
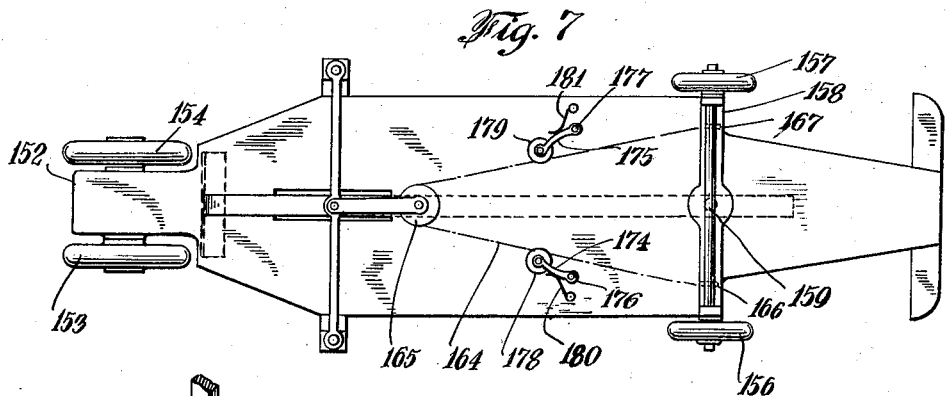
Fig. 7 is an inverted plan view thereof.
Figure 8:
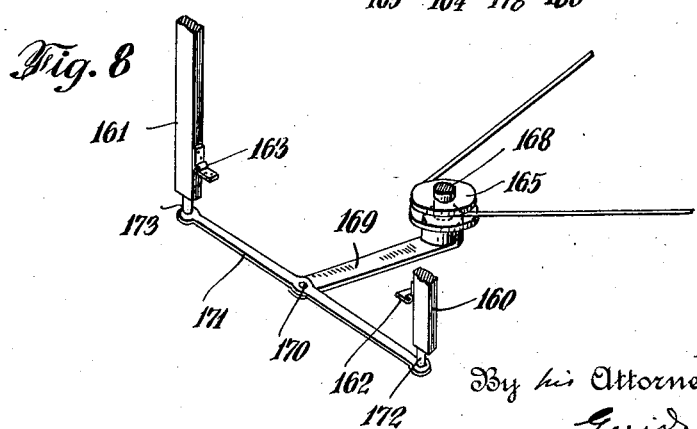
Fig. 8 is a detail fragmentary view in perspective of part of a steering arrangement used in the vehicle shown in Figs. 6 and 7.

A further modified type of steering mechanism with transversely movable steering control levers is illustrated in Figs. 6, 7, 8. The same represent a vehicle comprising a main platform 150, a seating platform 151, supported thereby, the main platform extending to the rear to form a foot stand 152, a pair of rear wheels 153, 154, mounted on an axle 155, supporting said foot stand, and a pair of front wheels 156, 157, mounted on a front axle 158, pivotally mounted underneath platform 150 at its central point 159.

For the purpose of steering the vehicle the same is provided at the rear with upwardly extending steering levers 160, 161, one at each side at the rear of platform 151 pivotally mounted at a point intermediate their ends to said platform by any suitable means, for instance, by hinges 162, 163, as shown.

Said steering levers can be moved about their pivotal point of attachment transversely to the axis of the vehicle as in the previous case, except that when the upper end of said levers is moved in a given direction, the lower end will be moved in the opposite direction.

As in the previous case, I provide a continuous length of cable or chain 164, passing over or wound around a drum or pulley 165, the two ends of said cable being attached at two opposite points of the front axle as shown at 166, 167.

In the present case pulley or drum 165 is mounted on a shaft 168, which rotates about a vertical axis, said shaft being provided with a rearwardly extending arm 169, pivotally connected at 170 to a cross member 171, constituting an articulated connection between the lower ends of levers 160, 161. A simple way of connecting said levers to said cross member is illustrated and may be obtained by providing the two ends of cross member 171 with openings within which may be inserted studs 172, 173, downwardly projecting from the lower ends of steering levers 160, 161, respectively.

In this manner, all angular displacements of the lower ends of the steering levers will result in a transverse displacement of the cross member, causing angular movement of arm 169 and shaft 168 about the axis of said shaft. As in the previous case this causes rotation of the drum or pulley 165, pulling one end of the cable and paying the other end so as to steer the front axle in one or the other direction.

Due to the arrangement of the various parts described, movement of the upper part of the steering levers in one direction results in a steering action causing the vehicle to turn in the same direction. For instance, if the upper parts of the steering levers are moved towards the left, their lower ends are moved towards the right, causing counterclockwise rotation of drum or pulley 165 with reference to Figs. 7, 8 and this in its turn results in a counterclockwise angular displacement of the front axle, steering the vehicle to the left.

If desired, suitable tensioning means may be provided for the cable as for instance, by means of arms 174, 175, pivoted underneath the platform at 176, 177, and carrying idler pulleys 178, 179, pressed against the sides of the cable strands by the action of spring 180, 181, respectively.

This arrangement has the advantage over the one previously described, that less room is required to accommodate the drum. In order to cause a fairly wide angular displacement of the front axle for a relatively small angular displacement of the drum it is desirable that the drum have a fairly large diameter. Therefore, when the clearance space between the platform of the vehicle and the ground is small, a drum rotating about a vertical axis may be preferable.

In Fig. 9, I show a further modified type of steering mechanism with laterally movable steering control levers. The steering levers 200, 201, are pivotally mounted as in the previous case at an intermediate point between their ends 202, 203, so as to be angularly movable transversely of the axis of the vehicle.

The lower end of each steering lever 204, 205, is connected by a flexible element 206, 207, to the opposite end of the front axle 208, as shown at 209, 210, respectively. Said front axle is pivotally mounted at 211 so as to steer the vehicle to the right or to the left.

This arrangement is therefore a simplified arrangement of the form shown in Figs. 6, 7, 8, the steering levers being in this case directly connected to the flexible elements.

In order to obtain a good direction of pull, on the steering axle by the flexible elements, the same are caused to pass over guide pulleys 212, 213, respectively. In Figs. 10 to 12, this arrangement is shown applied to a vehicle of the type illustrated in Figs. 6, 7.

The vehicle shown is somewhat different in construction in this that, the same comprises only the seating platform 214 composed of a number of longitudinal slats 215, connected at the rear end by a pair of transverse slats 216, 217, and at the front end by a slat 218.

The front wheels are mounted on an axle 219, pivotally mounted on a transverse member 220, spaced from transverse bar 218, and attached thereto by means of depending brackets 221. At the rear slat 216, is provided a depending bracket or supporting member 222, extending downwardly therefrom, and providing a rear support for two members 223, 224, running underneath the platform and extending both at the front and at the rear thereof. At the front end said two members are supported by cross member or slat 220.

Said two members may be made of channel or angle iron and their extreme front ends are preferably connected by a cross member 225, providing a foot rest for the child sitting on the platform. Said two members run close to the sides of the vehicle, one at each side up to a point underneath the rear end of the platform and then are bent inwardly as at 226, and then rearwardly as at 227, providing a support for a relatively narrow foot stand 228 just wide enough to accommodate the two feet of the rider close to each other.

In the construction shown in order to have a low center of gravity the rear axle 229 has its central part 230 offset, that is, said axle is formed in a U-shape, with the upper portions of its legs turned outwardly and coaxial with one another to provide the shaft portions for wheels 231, 232.

The central portion 230 of the axle is therefore at a lower level than the axis of the wheels and may be used as a support for the rear end of members 223, 224, and foot stand 228 carried thereby.

By virtue of this construction, foot stand 228, remains at a distance from the ground appreciably less than the radius of the rear wheels, and the stability of the structure is accordingly increased. At the same time wheels of a comparatively large diameter may be used, improving the easy running qualities of the vehicle.

From the foregoing it will be noted that the main features of my present invention may be applied in connection with vehicles of various types and descriptions and therefore the drawings will be understood as being intended for illustrative purposes only and not in a limiting sense. Various changes may be made in the details of construction without departing from the scope of the invention as specified in the appended claims.

I claim:

1. In a device of the class described, the combination with a vehicle frame provided with a foot stand, and a steering member, of two steering control levers pivotally mounted one at each side of said frame movable in a front to rear direction, and extending to a point within convenient reach of a child standing on said foot stand, and continuous flexible connection between said steering control levers and said steering member, causing one of said levers to move in one direction when the other lever is moved in the opposite direction.

2. In a device of the class described, the combination with a vehicle frame, provided with a seating platform, and a steering axle, of two steering control members pivotally mounted one at each side of said frame and upwardly extending therefrom, side railings for said platform connected to said control members and operable by a child seated on said platform, to move said control members, and flexible operating connections between said control members and said axle.

3. In a device of the class described, the combination with a vehicle frame, provided with a seating platform, and a foot stand extending at the rear of said platform, of a steering axle, two steering control members pivotally mounted one at each side of said platform, adapted to be independently operated by a child standing on said foot stand, side railings for said platform, connected to said control members and operable by a child seated on said platform to move said control members, and flexible operative connections between said control members and said axle.

4. In a device of the class described, the combination with a vehicle frame provided with a steering axle, of two upwardly extending steering control members pivotally mounted intermediate of their ends one at each side of said frame on transversely extending pivots, and a flexible element having its central portion at the rear of said frame turned forwardly to form two side strands connected each to one of said control members and having their ends operatively connected to said axle.

5. In a device of the class described, the combination with a vehicle frame, of a pivotally mounted front axle therefor, two upwardly extending steering control members, pivotally mounted intermediate of their ends, one at each side of said frame on transversely extending pivots, and a flexible element having its central portion at the rear of said frame turned forwardly to form two side strands connected each to the lower end of one of said control members and having their ends connected to said axle at points symmetrically arranged in relation to the pivotal support thereof.

ARVID I. LINDEN.